Nov. 16, 1926.

R. M. GILSON

PHASE METER

Filed Oct. 24, 1923

INVENTOR:
R. M. Gilson,
by A. L. Vencill
His attorney

Patented Nov. 16, 1926.

UNITED STATES PATENT OFFICE.

ROBERT M. GILSON, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA.

PHASE METER.

Application filed October 24, 1923. Serial No. 670,514.

My invention relates to phase meters, that is, to apparatus for determining the phase relation of two electro-motive forces.

I will describe one form of phase meter embodying my invention, and will then point out the novel features thereof in claims.

Figure 1:
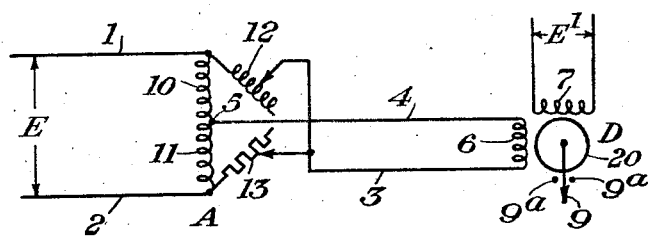
Figure 2:
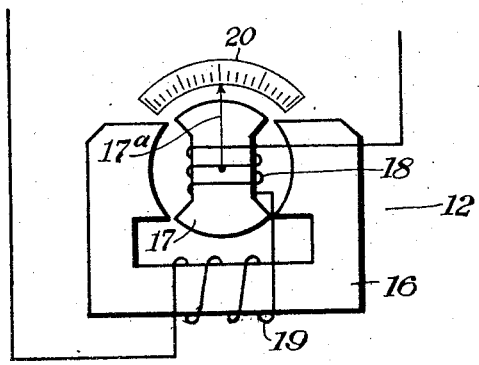
Figure 3:
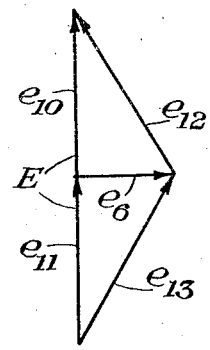

In the accompanying drawing, Fig. 1 is a diagrammatic view showing one form of phase meter embodying my invention. Fig. 2 is a view partly diagrammatic and partly in elevation, showing one form of variable reactor suitable for use in the phase meter illustrated in Fig. 1. Fig. 3 is a vector diagram showing the relations of the electro-motive forces in various parts of the apparatus of Fig. 1.

Similar reference characters refer to similar parts in each of the three views.

Referring first to Fig. 1, the phase meter comprises a phase displacement measuring device A which for purposes of simplicity I shall term a "phase shifter", and an indicator D. The phase shifter A comprises an auto transformer having its coils divided into two windings 10 and 11, by a terminal 5. As shown in the drawing the terminal 5 is at the electrical mid-point of the transformer. The reference character 13 designates a variable non-inductive resistance having one terminal connected with the lower terminal of winding 11. In similar manner a variable reactor 12 of constant resistance has one terminal connected with the upper terminal of winding 10. The free terminals of reactor 12 and resistor 13 are connected, by means of wire 3, with one terminal of a winding 6 of indicator D, the other terminal of winding 6 being connected with mid-point 5 of the auto transformer. The two windings 10 and 11 are connected in series, by means of wires 1 and 2, across the source of one of the electro-motive forces whose phase relation is to be measured.

The instantaneous voltages in phase shifter A are illustrated vectorially in Fig. 3. Assuming $e_{10}$ and $e_{11}$ to be the electro-motive forces in windings 10 and 11 respectively, their vector sum E will represent the electro-motive force applied to wires 1 and 2. Reactor 12 and resistor 13 are so proportioned that when these elements are all "cut in", the electro-motive force in reactor 12 is represented by the vector $e_{12}$, the electro-motive force in resistor 13 by vector $e_{13}$ and therefore the electro-motive force in winding 6 of indicator D is represented by vector $e_6$ which is displaced 90° from vectors $e_{10}$ and $e_{11}$. It is therefore clear that with reactor 12 and resistor 13 all cut in the electro-motive force in winding 6 is displaced 90 electrical degrees from the electro-motive force E across wires 1 and 2.

If the value of resistor 13 is kept constant and the inductance of reactor 12 is decreased, $e_6$ will lag behind vector E by a decreasing angle. When the inductance of reactor 12 is zero, $e_6$ will be in phase with E. Similarly if reactor 12 is kept constant at its maximum value and the value of resistor 13 is reduced, vector $e_6$ will lag behind vector E by an increasing angle. Assuming the resistance of reactor 12 to be small in comparison with its inductance, then when the resistance of 13 is zero, $e_6$ will be approximately 180° out of phase with E. The reactor 12 and the resistor 13 may be accurately calibrated so that the operator can determine at any time the exact phase relation between the electro-motive forces represented by E and $e_6$.

One form of variable reactor suitable for use in the phase shifter A comprises, as shown in Fig. 2, a U-shaped core 16 of magnetizable material such as laminated soft iron. A rotatable member 17, also of magnetizable material is mounted between the legs of core 16 so as to complete the magnetic circuit. This member carries a pointer 17ª co-operating with a fixed scale 20 for reading the setting of the device. A winding 18 is provided on member 17 and a winding 19 is mounted on core 16, the two windings being connected in series. It is plain that by rotating member 17 the fluxes generated by the two windings 18 and 19 can be made to aid or to oppose each other and thus regulate the reactance offered by the device from a maximum to substantially zero.

In addition to winding 6, indicator D comprises a winding 7 and a pointer 9. The winding 7 is connected with the source of the electro-motive force E′ which is to be compared with electro-motive force E supplied to phase shifter A. This indicator as here shown is an induction motor, the two windings 6 and 7 being the usual stator windings, and the pointer 9 being attached to the rotor 20. Pointer 9 occupies a position mid-way between the two stop pins 9ª only when the electro-motive forces supplied to windings 6 and 7 are exactly in phase. If the electro-motive force applied to winding 6 is out of phase with the electro-motive force supplied to winding 7, pointer 9 is swung in one direction or the other depending on whether the electro-motive force applied to winding 6 leads or lags.

To measure the phase relation of two electro-motive forces one electro-motive force E is connected with wires 1 and 2 and the other electro-motive force E' is connected with winding 7 of indicator D. The reactor 12 and resistor 13 are then adjusted till the pointer 9 assumes a central position thus indicating that the electro-motive forces in windings 6 and 7 are in phase. The phase difference between $e_6$ and E can then be observed from the values of 13 and 12, and since $e_6$ is in phase with the electro-motive force in winding 7, this phase difference is the phase difference between the electromotive forces E and E'.

Although I have herein shown and described only one form and arrangement of apparatus embodying my invention, it is understood that various changes and modifications may be made therein within the scope of the appended claims without departing from the spirit and scope of my invention.

Having thus described my invention, what I claim is:

1. In combination, two sources of electromotive force, an auto transformer connected with one of said sources, a variable reactance connected with one terminal of said transformer, a variable resistance connected with the other terminal of said transformer, the free ends of said reactance and said resistance being connected together at a point, and phase comparing means connected with the other source and between the mid-point of said transformer and said point.

2. In combination, two sources of alternating electro-motive forces, an auto transformer connected with one said source, a variable resistance connected with one terminal of said transformer, a variable reactance connected with the other terminal of said transformer, a winding connected from an intermediate point on said transformer to the free ends of said reactance and said resistance, a second winding connected with the second said source, and means responsive to the phase of the electro-motive forces applied to said two windings.

3. In combination, two sources of alternating electromotive force, a winding connected with one said source, two variable impedances of different power factors having a common terminal and having their free terminals connected with the terminals respectively of the winding, and phase comparing means connected with the other source and between said common terminal and an intermediate point on said winding.

In testimony whereof I affix my signature.

ROBERT M. GILSON.